June 9, 1931.  L. M. PERSONS  1,808,786
FLEXIBLE PACKING
Filed Dec. 8, 1927   2 Sheets-Sheet 1
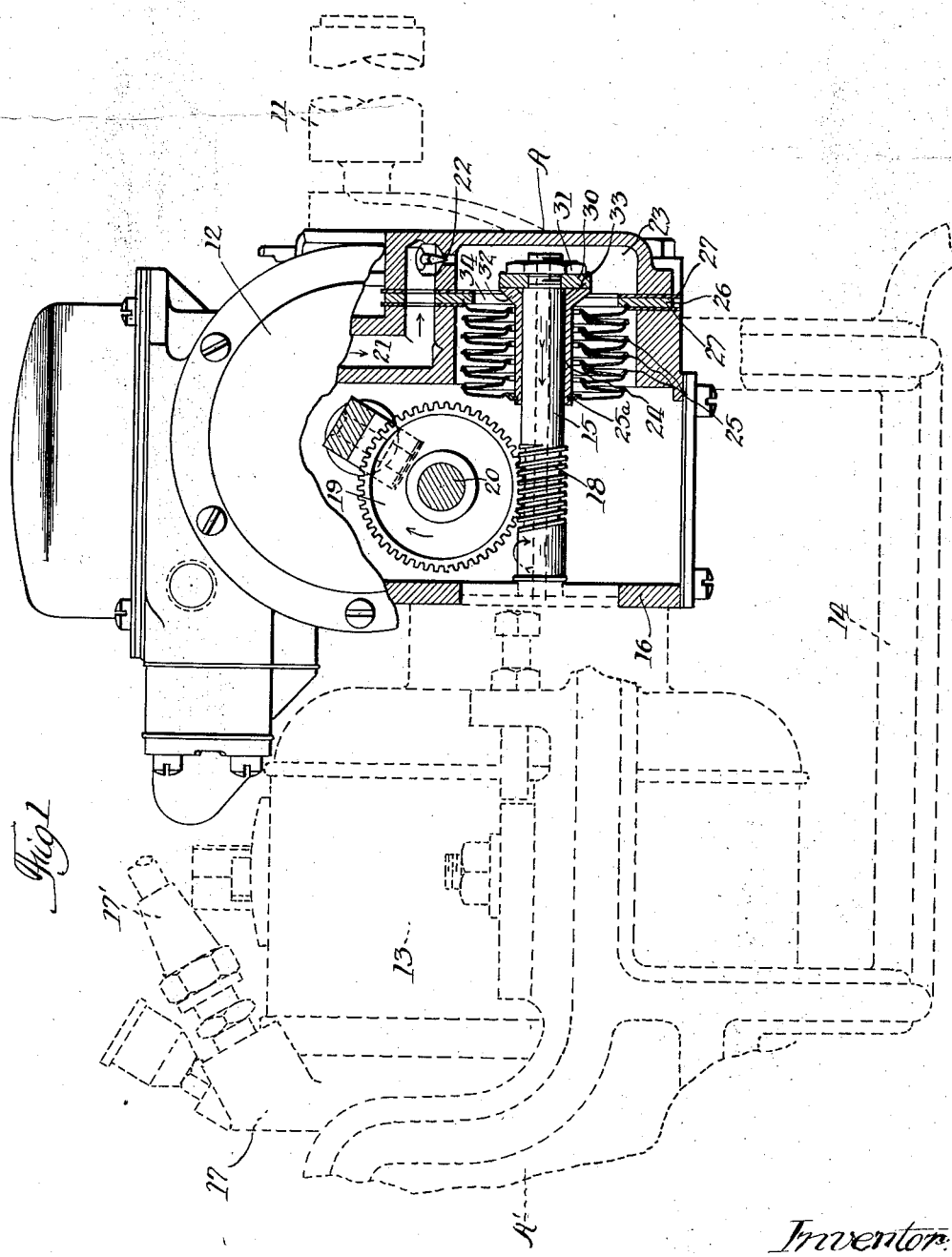
Inventor:
Laurence M. Persons
By Jones, Addington, Ames & Seibold
Attys.

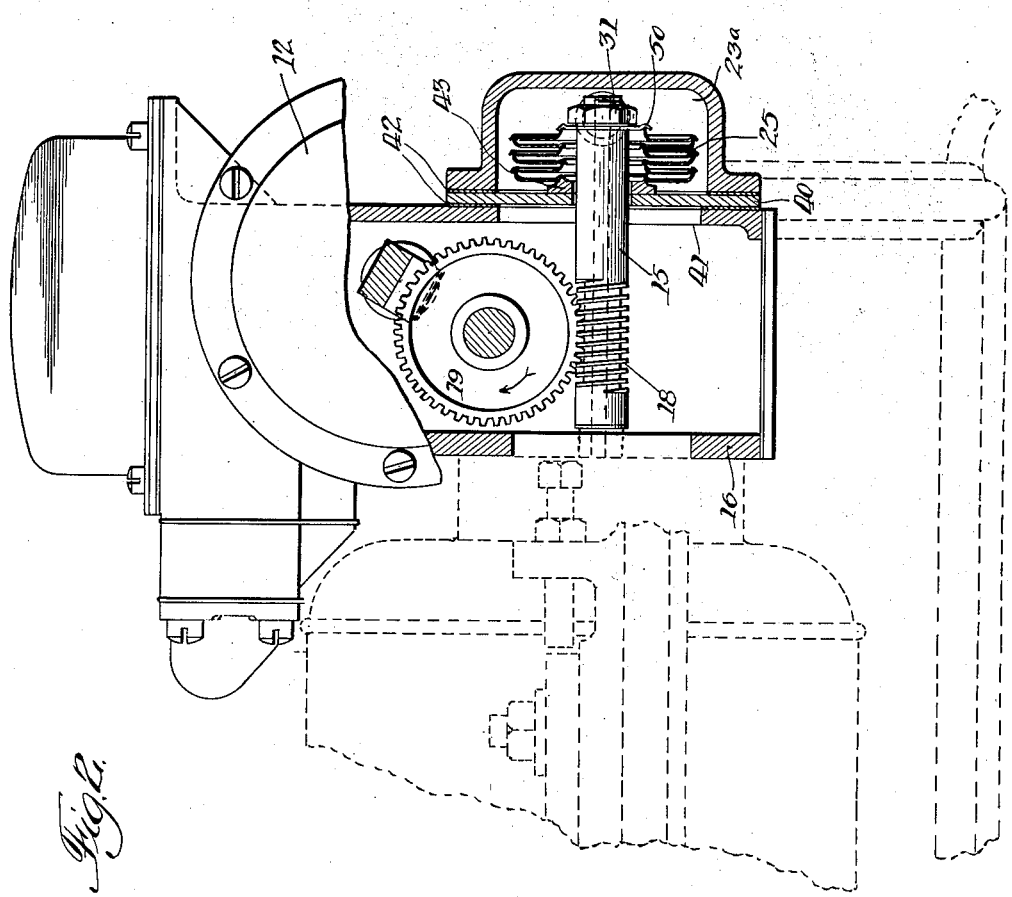

Patented June 9, 1931

1,808,786

UNITED STATES PATENT OFFICE

LAWRENCE M. PERSONS, OF CHICAGO, ILLINOIS, ASSIGNOR TO COOK ELECTRIC COMPANY, OF CHICAGO, ILLINOIS, A CORPORATION OF ILLINOIS

FLEXIBLE PACKING

Application filed December 8, 1927. Serial No. 238,504.

My present invention relates to an improved form of flexible packing means in connection with rotating parts of machinery.

Broadly, one of the objects of my invention is to provide a novel form of journal or bearing for a rotating shaft having a resilient element exerting a pressure against the parts to keep the bearing surfaces adequately lubricated, that is, to assure proper lubrication and prevent the entrance of other fluids or substances, which might unnecessarily tend to destroy the lubrication thus afforded.

A more specific teaching of my invention is to provide a flexible packing for a rotating shaft having a bearing therefor, which may be kept adequately lubricated, and by means of the flexible packing, prevent the escape of the lubricant or the entrance of a fluid, in contact about the rotating shaft, to the surfaces between the bearing and the shaft.

A further object of my invention is to provide a flexible packing which makes it possible to pass a fluid centrally through a hollow rotating shaft that is in communication with a fluid containing chamber, while, at the same time, maintaining a fluid-tight joint between said rotating hollow shaft and said chamber, and also permitting proper and sufficient lubrication of said rotating shaft.

A still further object of my invention is to provide resilient packing means that support a journal in which a hollow rotating member is rotatably mounted so as to permit the entrance of lubricants between the metallic surfaces of the rotating shaft and its journal, while, at the same time, access of fluid passing centrally through said shaft to said bearing surfaces is prevented.

Another object of my invention is to provide a flexible means whereby it becomes possible to utilize the shaft of an electric or equivalent motor as a means for conveying fluid that is pumped by pumping means associated with or driven by said motor, and to lubricate said hollow shaft in an efficient manner, and to prevent access of the liquid being pumped to the bearing surfaces of said hollow rotatable shaft.

A still further object of my invention is to construct an improved form of flexible packing joint for preventing a fluid that is being pumped from a chamber through a rotating hollow shaft from escaping into a lubricating chamber associated with said shaft, while, at the same time, preventing the running-dry of said bearing.

Other objects of my present invention will appear in connection with the description hereinbelow and the drawings which accompany the same, in which drawings:

Figure 1 is a partially elevational and partially sectional vertical view of my improved form of flexible packing in a specific installation, which, in the present case and for purposes of illustration, is shown in relation with a pump; and Fig. 2 is a partially elevational and partially sectional view of a modification of my invention, also applied to a pump.

Referring to Fig. 1, the same illustrates a partially sectional elevational view of a pump, which may be of the type employed for conveying a liquid fuel from a storage tank to a burner designed to burn said liquid fuel, as for example a commercial furnace burner. The liquid fuel is drawn from any suitable source, such as a tank or the like, (not shown) through the pipe 11 into the interior of a pump 12, which may be of any suitable construction, and whose interior construction is therefore not shown in detail as any mechanism capable of drawing and delivering a liquid is suitable for the purpose.

This pump is actuated by a suitable electric motor 13 which is mounted together with pump 12 upon a common base or support, broadly designated as 14. It is to be understood that the shaft of motor 13 is or may be co-axial with a hollow tubular shaft 15 which traverses a housing 16 that forms part of pump 12. This common axis is designated by the letters A—A' in Fig. 1. The said hollow shaft 15 is coupled to the motor shaft (not shown) and forms a continuous hollow passage therewith, which permits the passage of liquid therethrough, said liquid being discharged through said hollow motor shaft to a burner 17, which burner may be provided with the usual electrical ignition device 17'.

Shaft 15 is provided on its outer periphery with spiral threads forming a worm-gear 18, which, in turn, meshes with the teeth of a gear 19, which gear 19 is keyed to a shaft 20 that drives pump 12.

Pump 12 delivers liquid fuel through the passage 21 in the direction of the arrows shown therein. This fluid enters through a valve controlled aperture 22 into a chamber 23, whence it escapes through the interior of the rotatable tube 15, as indicated by the arrows.

In order to prevent the escape of the liquid from the chamber 23 into the housing 16 which contains the gears 18 and 19 and the hollow shaft 15, there is provided a floating journal 24, which, in turn, is supported by one or more flexible metallic discs 25. These discs, or the first of said discs if more than one be used, is firmly attached to a plate 26, which is interposed between the housing 16 and the chamber 23, suitable packing 27 being employed between said plate, housing and chamber so as to preclude the leakage of fluid therethrough, except at openings specifically provided for this purpose.

The journal 24, in the form illustrated in Fig. 1, is supported by the flexible discs 25 which are jointed together to form what is commonly known as a metallic bellows, the inner edge of the last disc 25a being welded or otherwise joined to the floating journal 24. The rotatable hollow shaft 15 is fitted through said journal, the journal and shaft being so machined that a very close mechanical fit may be assured, if so desired, the said journal acting as a bearing for this shaft 15. The shaft 15 at the part that extends inwardly of the chamber 23 is provided with a plate 30 rigidly attached thereto and rotatable therewith, being held in position by a nut 31 screwed on to the threaded end of the shaft 15. As will be seen in Fig. 1, the plate 30 bears for a substantial part of its surface against the flat end 32 of the floating journal 24, it being understood that both the said flat end as well as the plate 30 are machined and ground at the point where they contact with each other, these surfaces being designated as 33.

In the disclosure shown in Fig. 1, the motor shaft 15 will rotate in a clockwise direction, as shown by the arrow thereon. It will be noticed that this movement will have, in the present instant, a tendency to thrust the shaft 15 inwardly or toward the left against the tension of the spring disc or discs 25.

In order to ensure the proper lubrication of the worm 18 and the gear 19 it is to be understood that a supply of lubricant is contained in the housing 16 and one of the objects of my invention is to assure that this lubricant is maintained between journal or bearing 24 and shaft 15, and also between the surfaces 33 of expanded portion 32 and plate 30. And further, it is desirable that the lubricant should work forwardly along the shaft 15 from the interior of housing 16 and spread outwardly between the surfaces 33, so that the force acting to keep the lubricant thus spread will prevent the liquid fuel from entering, and, at the same time, tend to prevent the outward escape of the lubricant.

The construction shown in Fig. 1 makes this possible. It has been found by actual experiment that the arrangement of the shaft 15 and its journal 24, allows enough lubricant to be drawn into the journal to provide proper lubrication therebetween, as well as between the surfaces 33 without allowing its escape at the periphery of the latter, or the admission of liquid fuel.

I find that when the motor is running a slight thrust of the shaft 15 to the left, in the illustration shown in Fig. 1, might at times be present, but in any event the lubricant will be introduced between the journal and the shaft. This lubricant is permitted to work its way along the interior of the journal 24 until it reaches the plate 30 where the centrifugal force there exerted by reason of the rotation will tend to throw the lubricant out between the surfaces 33 and the enlarged end 32 of the journal 24 and the plate 30, so that the lubricant will reach to the outer extremity of the bearing surfaces 33. The inward thrust of shaft 15, if any, acts, through plate 30 and journal 24, against discs 25, the tension of which tends to press the journal 24 in the opposite direction against the plate 30. Thus, a relatively tight fit is obtained between these parts, particularly between surfaces 33, so that the lubricant is held therein, but allowed to work itself about, say by centrifugal force, to afford proper lubrication. This action, on the other hand, tends to prevent the admission of liquid fuel, which might destroy the effects of lubrication and render the surfaces dry. However, enough of the lubricant remains in the space between the shaft 15 and the journal 24 to lubricate the same perfectly at all times, this being one of the inherent advantages of the construction forming the subject-matter of my present invention.

The flexible discs 25 shown herein serve as a flexible packing as well as to exert pressure against the bearing parts. Obviously, other arrangements may be provided wherein one or any number of discs 25 may be furnished for the sole purpose of pressing the bearing parts together, in the manner described above, to prevent the entrance of liquid fuel or other fluid between the relatively movable parts 24 and 30, and to maintain a suitable lubricant therebetween.

The flexible discs 25 may be of any suitable material such as bronze, or steel, and the attachment of the first disc to the plate 26 may be by riveting, welding or equivalent mechanical means. When my device is used for pumping a liquid which might be contaminated by the lubricant within the housing 16, it is found that the entry of the lubricant into the chamber 23 through which the liquid being pumped passes is very effectively prevented. However, if a liquid fuel is pumped through the chamber 23, and if perchance any lubricant should enter said liquid fuel no great harm would result as this simply would be burned together with the fuel in the burner attached to the pump and motor.

Furthermore, the journal 24, being supported by flexible and resilient means, can weave sufficiently to take care of any inequalities in the movement of the motor and the shaft 15 that is attached to it, and the shaft will not bind in the journal even if it does not run absolutely true.

By the construction invented by me, all stuffing boxes and other make-shift arrangements to prevent undesired leakage of fluid into the lubricating chamber or vice-versa is prevented. For small pumps, or similar equipment, it would be sufficient to have but a single flexible disc, which is preferably slightly cupped outwardly from the chamber 23, in which case the journal can be much shorter than the one shown in Fig. 1.

An alternative method of constructing my new flexible packing is that shown in Fig. 2, in which figure similar reference characters refer to parts similar to those shown in Fig. 1. The motor, burner and other parts are not shown in Fig. 2, as this is not necessary for the proper understanding of this modification of my invention. In the modification shown in Fig. 2, the flexible packing is located on the interior of the chamber 23a, which in general corresponds to chamber 23 shown in Fig. 1, except that in the present case it is to be understood that the entrance of the fluid to said chamber is located in that part of the machine that is cut away and may be assumed to be in a direction vertically upwards from the sheet upon which the drawing is made. However, the method of introducing the liquid into the chamber is purely a matter of convenience. In Fig. 2, I have shown the housing 16 and have indicated the worm 18 and the gear 19 in outline, and have shown the shaft 15 which, however, in this case, does not have a supporting journal, such as that shown in Fig. 1. In place of this journal there is provided a plate 40 which is placed over an opening 41 in the housing 16 and serves completely to cut off communication between the chamber 23a and the interior of the housing 16. This plate is also provided with suitable packing 42 placed between the plate and the housing 16, and the plate and the chamber housing, respectively. Rigidly attached to the rotatable shaft 15 is a disc 25, or there may be a plurality of the same, which when joined together form a metallic bellows which in this case is open toward the interior of the chamber 23a'. This bellows also supports a plate 43, which is rigidly attached thereto, and which has a ground flat surface which bears against the aforesaid plate 40 so as to prevent egress of fluid from the interior of the chamber 23a' between these parts.

It is to be understood that lubricating material is contained in the housing 16 to lubricate the worm 18 and gear 19 and that this lubricant has access to the periphery of the shaft 15 and also works into the space between the plates 43 and 40 so as to lubricate the bearing formed by their contact. The thrust of the shaft 15 and the resiliency of the discs 25 will cause the contact between plates 43 and 40 to be close, although the viscosity of the lubricant in the housing 16 is sufficient to prevent metal-to-metal contact. The disc 25 is held to the rotatable shaft 15 by a flange 50 attached to the same which, in turn, is held on the shaft by a nut 31, which nut is similar to that shown in Fig. 1. In the present modification, therefore, the disc rotates with the shaft, instead of being stationary as in the first modification described.

I wish it to be understood that, depending upon the size of the shaft, the speed of rotation of the same, and the amount of fluid to be transmitted therethrough, there need not be more than a single disc 25, and that when a plurality of the same are used, this is done merely to reinforce the floating journal or the shaft, whichever the case may be, so that in case of a larger pump and a larger shaft more of these discs will be employed. The discs are more or less cupped or "dished", in order to increase their flexibility and resilience.

It will also be understood that my invention, in its broader aspects, is not to be limited in its application to a pump, solely, but may be applied to any rotating shaft where lubrication by the method herein described is desirable.

Equivalents for the construction shown by me are to be considered as coming within the purview of my present invention, for which I claim:

1. In combination, a motor having its shaft provided with an axial passage therein, a pump, a housing having a chamber into which liquid is delivered by said pump and into which one end of said motor shaft extends, said motor shaft receiving the fluid in said chamber through said axial passage for delivery to an outlet at the opposite end, and means for supporting said end of the motor shaft in one wall of said chamber including a relatively rotatable sleeve and collar on said shaft, both having cooperating bearing surfaces, and a resilient packing fixed between said housing and one end of said sleeve, said packing tending to urge said sleeve to engage against said collar whereby to maintain said bearing surfaces in close contact and to thereby retain a lubricant film therebetween and prevent leakage of fluid between said surfaces.

2. In combination, a housing having a lubricant containing chamber and a chamber into which liquid is pumped, a drive shaft extending through said lubricant containing chamber with its end projecting into said liquid chamber, said drive shaft having an axial passage therein to deliver the liquid in said chamber to an outlet at a remote point thereon, and means for supporting the end of said shaft whereby to provide lubrication to said shaft and prevent the leakage of fluid into the lubricant containing chamber including a collar fixed to the end of said shaft and a bearing sleeve in which said shaft rotates, said collar and said sleeve having cooperating bearing surfaces thereon, and a resilient packing fixed to said housing and said sleeve for yieldably holding said sleeve against said collar to maintain said bearing surfaces in close contact and said shaft and said bearing surfaces lubricated by the lubricant in said lubricant containing chamber.

3. In a device of the class described, the combination of a rotating shaft provided with an axial passage for the flow of fluid therethrough, a housing forming a closed lubricant containing chamber and a closed fluid containing chamber, a wall between said chambers providing a bearing for one end of said shaft whereby the fluid may flow from said fluid chamber through said axial passage to the opposite end, and bearing surfaces on said wall so arranged as to cause the lubricant to travel along the periphery of said shaft and centrifugally outward, thereby acting as a seal to the passage of fluid in said fluid chamber, said wall being resilient and having a non-rotating sleeve in which the end of said shaft is carried, and a rigid member on said shaft and rotatable therewith, the resiliency of said wall acting against the thrust of said shaft to force said sleeve against said member and maintain said bearing surfaces in close contact with each other.

4. In a device of the class described, the combination of a rotating shaft provided with an axial passage for the flow of fluid therethrough, a housing forming a closed fluid containing chamber, a wall through which one end of said shaft projects and enters said chamber whereby the fluid may flow from said chamber through said axial passage, a sleeve carried in non-rotating relation by said wall, the end of said shaft being carried by said sleeve, a collar at the end of said shaft, one end of said sleeve abutting against the end of said collar, and a resilient member forming part of said wall for yieldably holding said sleeve against said collar.

5. In a device of the class described, the combination of a rotating shaft, a pump, a drive between said shaft and said pump, a housing forming a closed lubricant containing chamber and a closed fluid containing chamber, said pump delivering fluid to said fluid chamber, a wall between said chambers, a non-rotating sleeve carried by said wall, a rigid collar on said shaft, a bearing surface on said collar, a cooperating bearing surface on the end of the sleeve abutting against said collar, said surfaces being lubricated by the lubricant in said lubricant containing chamber, and means associated with said wall acting yieldably to hold said sleeve against said collar whereby to maintain said lubricated bearing surfaces in close contact with each other, the lubricant film between said surfaces acting as a seal against the leakage of fluid in said fluid chamber.

6. In a device of the class described, the combination of a rotating drive shaft having an axial passage for the flow of fluid therethrough, a pump, a driving connection between said drive shaft and said pump, a housing forming a closed chamber into which fluid is delivered by said pump, said drive shaft extending into said chamber with one end of said axial passage open thereto to receive the fluid pumped thereinto, a non-rotating sleeve on said end of said shaft, an abutment on said shaft against which said sleeve may be held, and means for yieldably pressing said sleeve against said abutment.

In witness whereof, I have hereunto subscribed my name.

LAWRENCE M. PERSONS.